Feb. 23, 1943. C. L. HUTCHINSON ET AL 2,311,755
APPARATUS FOR MAKING SHEET WRAPPING MATERIAL
Filed June 22, 1940 2 Sheets-Sheet 1
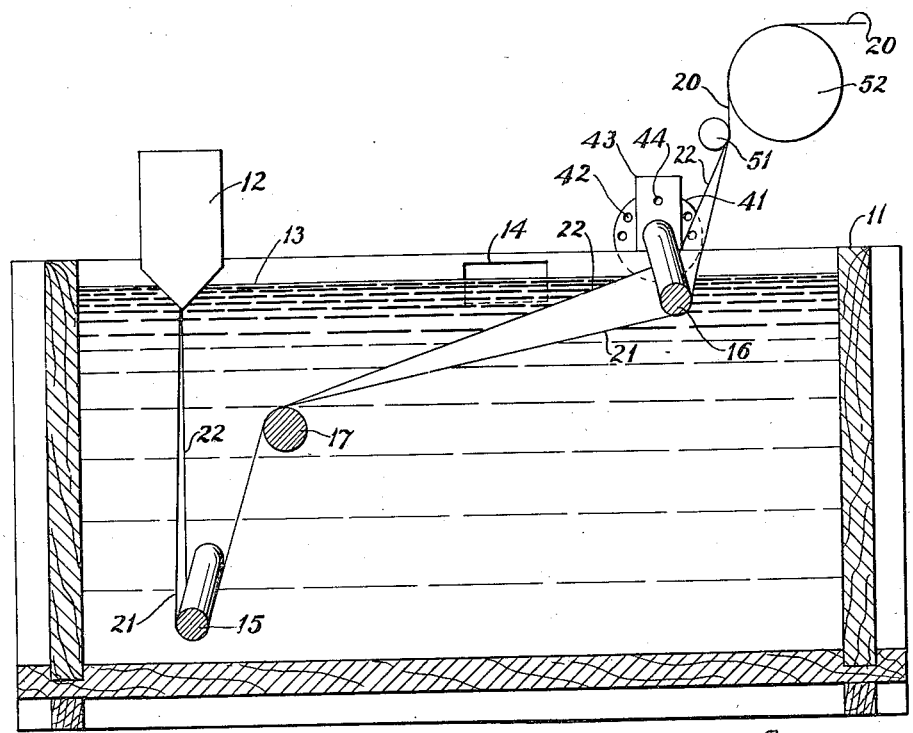
Fig. 1
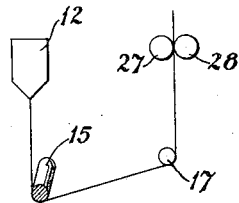
Fig. 2
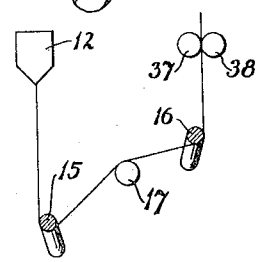
Fig. 3
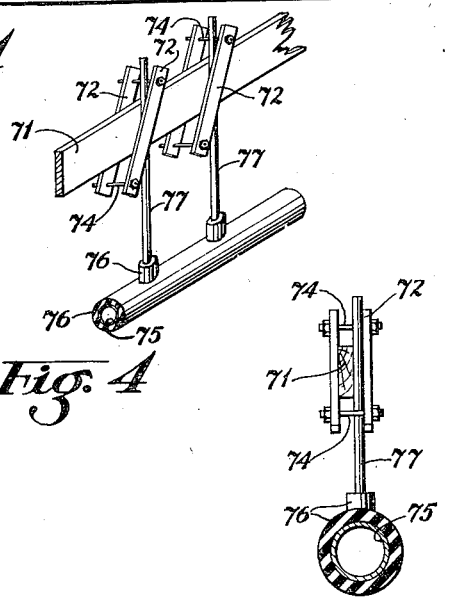
Fig. 4
Fig. 5
Charles L. Hutchinson
George R. Eckstein
INVENTORS
BY
ATTORNEY Feb. 23, 1943.  C. L. HUTCHINSON ET AL  2,311,755
APPARATUS FOR MAKING SHEET WRAPPING MATERIAL
Filed June 22, 1940  2 Sheets-Sheet 2

Charles L. Hutchinson
George R. Eckstein
INVENTORS
BY
ATTORNEY

Patented Feb. 23, 1943

2,311,755

UNITED STATES PATENT OFFICE 2,311,755

APPARATUS FOR MAKING SHEET WRAPPING MATERIAL

Charles L. Hutchinson and George R. Eckstein, Buffalo, N. Y., assignors to E. I. du Pont de Nemours & Company, Wilmington, Del., a corporation of Delaware Application June 22, 1940, Serial No. 341,894

6 Claims. (Cl. 18—15)

This invention relates to sheet wrapping material, especially transparent, water-sensitive cellulosic web. More specifically, it appertains to the manufacture of regenerated cellulose film having superior physical characteristics. More particularly it relates to a coagulating apparatus for preparing regenerated cellulose sheet of improved homogeneity of shrinkage characteristics, tear resistance, tensile strength, and the like, from viscose.

Recently there has appeared in commerce a transparent cellulosic sheet wrapping material. The manufacture of such a material in a continuous manner from viscose is disclosed in U. S. A. Patent No. 1,548,864 (Brandenberger). This procedure, which is particularly well suited to large scale operations, in general involves continuous extrusion of a sheet of cellulose xanthate solution (viscose) through a narrow slot directly into a coagulating (and/or regenerating) bath. The extruded web is continuously withdrawn from this bath for subsequent processing steps, such as washing, desulfuring, bleaching, softening, and drying.

It is known that the various physical properties such as tear resistance, deformational changes with changes in relative humidity and the like, of the regenerated cellulose sheet prepared in this manner are extremely undesirable. A great deal of research has been done in an effort to cure this defect. One very satisfactory procedure is that of removing restraining forces from the web while it is traveling through the converting (regenerating) environment which follows the aforementioned coagulating treatment (see U. S. A. patent application, Serial No. 307,024, filed December 1, 1939, by Hutchinson). In this manner the natural shrinkage of the web eliminates the previously formed directional inequalities.

It has now been found that the desired improved product can be obtained by appropriate treatment of the web material before or during the early stages of conversion. Recent developments have shown that non-rotating guides may be utilized in viscose coagulating baths (see U. S. A. patent application Serial No. 314,810, filed January 20, 1940, by Brandenberger & Fenal). The utilization of a stationary guide member makes operation with unsymmetrical guides, such as curved rods, feasible. More particularly, it has been found that by utilizing curved rods in the coagulating bath the partially converted gel web is stretched in such a manner that the sheet wrapping material as finally produced has very desirable physical characteristics.

The primary object of this invention was to provide improved means for coagulating and/or regenerating transparent, non-fibrous cellulosic pellicles from aqueous dispersible media. Further objects were to provide improved apparatus for handling thin, cellulosic webs immediately after extrusion of the cellulosic dispersion, to provide means for restricting the shrinkage of webs which normally occurs during the early stages of processing, and to produce webs of greater width than has heretofore been possible with a given extrusion orifice. A still further object was to provide means for controlling and/or adjusting the longitudinal and transverse dimensions of a web of regenerated cellulose individually or in relation to each other. Yet further objects were to provide means for controlling the longitudinal and transverse dimensions of a web of regenerated cellulose in such a manner as to control the orientation of the micelles of which the cellulose is composed, to stretch freshly coagulated cellulosic webs while they still have a very high degree of plasticity, and to pass continuous cellulosic webs over curved guide members shortly after extrusion of the cellulosic material in sheet form. A general advance in the art, and other objects which will appear hereinafter, are also contemplated.

In general, the invention is carried out by passing a web of coagulated and/or partly regenerated viscose or similar water-dispersible cellulosic material, such as low substituted cellulose ethers, across and around a rod or other guide member exhibiting curvature which lies in a plane perpendicular to the direction of the motion of the web so that the path of travel of the central portion of the web is increased over that of the marginal portions. One or more such guiding members can be utilized, and they may be used alone or in conjunction with straight guide members. The curved guides may be at the beginning or at the exit or at intermediate locations in the coagulating bath. Such guides located at the beginning of the coagulating bath should be at a distance from the extrusion orifice sufficient to permit the extruded web to be coagulated to the extent of self-support. The web loses plasticity as it advances through the coagulating bath, and the distance which the guide is moved from the extrusion orifice should be correlated with the plasticity of the web at that point in its travel.

From the following description, in which is disclosed certain embodiments of the invention as well as details of what is believed to be the best mode for carrying out the invention, it will be apparent how the foregoing objects and related ends are accomplished. The written description is amplified by the accompanying drawings, in which:

Figure 1 is a diagrammatic, side elevation, partly in section view, showing a regenerated cellulose web casting apparatus;

Figure 2 is a diagrammatic side elevation view of the viscose extrusion hopper guides and withdrawal or squeeze rolls in an arrangement modified from that shown in Figure 1;

Figure 3 is a diagrammatic side elevation view of the viscose extrusion hopper guides and withdrawal or squeeze rolls in an arrangement modified from that shown in Figure 1;

Figure 4 is an isometric view of the section of an adjustable guide for use in a coagulating bath;

Figure 5 is an end view of the section of the adjustable guide shown in Figure 4;

Similar characters refer to similar parts throughout the several views.

Figure 6:
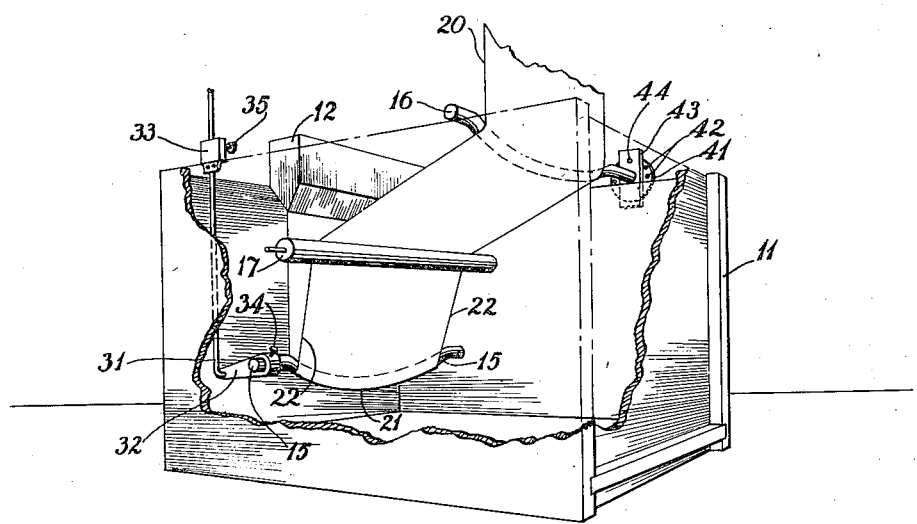
Figure 6 is a perspective view of a casting apparatus somewhat similar to that illustrated in Figure 1.

Referring to Figures 1 and 6, the numeral 11 indicates the tank in which the cellulosic material is coagulated. An extruding hopper 12 extends below the liquid level 13 of the coagulating bath. An overflow outlet 14 maintains the bath at constant level. As shown in these figures, there is a curved premier guide 15 and a curved exit guide 16. Located between these guides is a conventional straight guide 17. The web 20, passing through this coagulating bath, moves across the bowed portions of the guides 15 and 16 so that its central portion 21 travels a greater distance than its marginal portions 22. The guides 15 and 16 can be rotated on an axis extending through their ends, as will be clear from a consideration of the detailed view in Figure 7. A rod 31 and lever 32, sliding in the block 33, regulate the position of the guide 15 about its aforementioned axis. A crank (not shown) on one end of the guide 16 is utilized for rotating it to the desired position. A disc 41, having perforations 42, rotates with the guide 16. A member 43 fixed on the side of the tank 11 has a perforation 44 which registers with the perforations 42, so that by inserting a pin therethrough the guide 16 can be fixed in any desired position. A wiper rod 51, and a transfer roll 52, are shown in Figure 1. The wiper rod serves to remove excess fluid from the web as it leaves the coagulating bath.

In Figure 2 an arrangement is shown in which only one guide member 15 is utilized in the coagulating bath. Squeeze rolls 27 and 28, which serve to withdraw the web from the coagulating tank and remove excess coagulating liquid, are also shown in this figure.

In Figure 3 an arrangement similar to that shown in Figure 1, but with the guide members 15 and 16 rotated to a different angle, is illustrated. The squeeze rolls in this figure are 37 and 38, and the intermediate straight guide member is indicated at 17.

Figure 7:
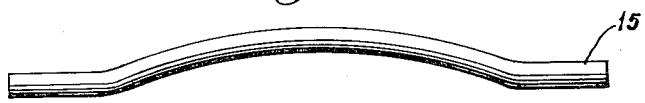
Figure 7 is a side view of a guide member of the type illustrated in Figure 6.
Figure 8:
Figure 8 is a side view of a modified guide member.

As previously indicated, the rods 15 and 16 are identical in shape and are illustrated in detail in Figure 7. A modified form of guide 85 is shown in Figure 8. This guide 85 has a flat central portion so that most of the transverse stretching takes place near the margin of the web. Guides like this may replace those shown in Figure 1, or both types may be used in the same coagulating bath.

Figure 9:
Figure 9 is a modification of the guide member shown in Figure 7, in which a supporting member is secured across its curved section in order to increase its rigidity.

At 95 in Figure 9 a support member 91 is welded across the body part of the curved guide rod to increase its rigidity.

It sometimes happens that adjustments along the width of the rod, which deviate from a straight line or constant curve, are desired. An apparatus for accomplishing this is disclosed in Figures 4 and 5, wherein the guide member 75 is a flexible tube having a rubber sheath or casing 76. At short distances along this guide sustaining rods 77 are rigidly secured. A rigid member 71 inside the curved path of the travel of the web, and brackets 72, secure the aforementioned rods 77 to the cross-member 71 in any desired position. As will be obvious, individual adjustments of the various rods 77 will bring about any desired contour in the guide member 75.

By way of further detail, the brackets 72 comprise flat strips secured together by bolts 74. A set screw 34 maintains the lever 32 in fixed position on the rod 15, and a set screw 35 maintains the rod 31 in any desired position in the fixed bearing or bracket 33.

In operating the apparatus, viscose is extruded from the extrusion slit or orifice of the hopper 12, into the coagulating bath. After receiving a superficial coagulation, the sheet, which originally had the width of the extruding orifice but which has, due to coagulation and/or regeneration, begun to shrink rapidly, reaches the curved guide member 15. It passes about this guide in such a manner that the central portion of the web is displaced in its line of travel to a greater extent than the marginal portions of the web. By placing the guide 15 so that the coagulation of the web has not taken place during more than 30 inches of travel, the guide contacts the web when it has its highest degree of plasticity coincidental with sufficient strength to be self-supporting, and as a result, the maximum effect in introducing a transverse stretch into the web is obtained. This stretch may be controlled to exactly restore the shrinkage between the extrusion orifice and the guide member 15. If desired, the curved guide member may be turned about its axis to another position so that the transverse stretch only partially compensates for the aforementioned shrinkage, or the guide 15 may be clamped in still another position which causes the stretch to exceed the amount of shrinkage.

After passing through the coagulating bath and remaining in contact therewith for a sufficient period of time to produce the necessary toughness and strength to permit its being handled in air, the web makes its exit through a pair of squeeze rolls or other means of obtaining a positive drive, and is then conveyed to the subsequent treating sections of the film casting machine.

Two curved guides will produce transverse stretching sufficient to meet ordinary commercial needs, but more curved guides may be utilized if desired. The guides should be arranged so that there are no upwardly extending pockets in the web which may entrap gas. The total stretch can be distributed among the different curved guides in any desired manner. The greater the ratio of the distance traveled by the center of the web to that traveled by the margins, the greater the extent of the transverse stretch exhibited upon the web by any individual guide. It follows that by turning the various guide members about their lengthwise axis, adjustments may be made from time to time to compensate for any variations which may be caused by other factors in the complete casting process.

One guide will suffice when only a slight transverse stretching is contemplated. This may be located at the beginning or end of the web travel in the coagulating bath.

Conventional methods of manufacture give the regenerated cellulose webs a considerable stretch in the longitudinal direction (machine direction, direction of travel) as force must be exerted in that direction in order to overcome the fractional drag of the supporting members and the treating baths. In the preferred embodiment of the invention the transverse stretch imparted to the web by means of the curved guide members is adjusted so that it will be equivalent to, and compensate for, the longitudinal stretch imposed after coagulation by the mechanism which forwards the web through the apparatus.

The parts are given by weight throughout the application unless otherwise specified.

Example I

Viscose containing 8.5% cellulose and 6.5% caustic soda was extruded through an orifice as is customary in the manufacture of regenerated cellulose sheeting. The hopper lips were beneath the surface of the coagulating (and/or regenerating) bath, which comprised 12% sulfuric acid and 18% sodium sulfate. After a travel of 10 inches through the bath, the web passed across a curved guide member of the type shown in Figure 8. After further travel through the bath over a conventional guide member as illustrated in Figure 1, it passed about a second curved guide member of the type shown in Figure 7. Both curved guide members and the straight intermediate guide were of circular cross-section. They were positioned with respect to the web, as shown in Figure 1.

The first curved guide member distended the center of the web 6 inches from the line connecting the margins of the web. The second curved guide member distended the center of the web 4 inches from the corresponding line. A transverse stretch of 10% was produced by the first curved guide member. The degree of stretch caused by the second guide member was 4%, making a total of 14%.

The first curved guide member tended to stretch the center of the web more than the margins. This is quite advantageous, because the delicate marginal portions are not overstrained by such a treatment. The second curved guide member stretched the web uniformly throughout its width. Either type of guide member may be used at the various positions in the coagulating bath, depending upon the results desired.

After the aforementioned web had been finished and dried in the manner described in U. S. A. Patent No. 1,548,864, it was found to have remarkable uniformity in the two directions, transverse and longitudinal (machine direction). It also had more uniform properties across the full width of the web than material produced in the usual manner.

Example II

Viscose similar to that of Example I was extruded through a suitable orifice into a bath consisting of an aqueous 18% ammonium sulfate solution. The extruded web of viscose was coagulated to a self-sustaining pellicle by this bath, but it was not regenerated to cellulose thereby. In this coagulated state it was particularly susceptible to stretch in the transverse direction by the method and apparatus previously described. Treatment of the web as described in Example I produced a web which had 17% greater width at the exit of the bath than was the case when straight guide members were substituted for curved guide members.

After leaving the coagulating bath, the web was then passed to an acid bath in which regeneration took place. The regenerated material was then processed in the conventional manner previously disclosed. It was found that the final product had very desirable uniformity in all directions.

If desired the stretch treatment may be repeated with curved guides in the regeneration bath.

Example III

A viscose containing 7.5% cellulose and 6.5% caustic soda in a state of suitable ripeness was extruded from a conventional casting hopper in the manner previously disclosed. The viscose was extruded at a rate of 25 meters per minute. After traveling at the rate of 35 meters per minute through the coagulating solution for a distance of 12 inches, the web passed around a premier guide member of the type disclosed in Figure 7, which caused displacement of the center of the web 6 inches from the line connecting the margins of the web. The web then proceeded for a sufficient period through the bath to obtain the necessary strength to permit handling in the air, after which it was led from the tank containing the coagulating bath into the succeeding treatment tanks previously disclosed.

There resulted a sheeted product having a material increase in width (of the final dried product) as well as a superior homogeneity of physical characteristics (in the finished product).

Example IV

Viscose containing 8% cellulose and 6.5% caustic soda was extruded into a coagulating bath in the conventional manner. The extruded web was kept in the coagulating bath by a passage around straight guides until it had acquired the mechanical strength necessary to withstand the subsequent treatments which it was to receive, was then passed about a curved guide of the type illustrated in Figure 8, and was immediately thereafter removed from the bath for subsequent processing. The curved guide caused a displacement of 5 inches between the center of the web and the line joining the margins thereof. After conventional desulfurization, bleaching, softening and drying, a finished product of greatly improved homogeneity of physical characteristics was obtained.

In the conventional procedures for the manufacture of film from cellulose xanthate solutions, the viscose is extruded directly into the coagulating and/or regenerating bath. Sometimes it is found desirable to extrude the viscose into air, but when this is done, there is only an extremely brief travel through air (less than 1 inch), after which the film immediately enters the bath which brings about coagulation. Coagulation of the viscose upon the surface of the extruded sheet commences immediately upon contact with the bath. The coagulation phenomena rapidly extends through the thickness of the sheet so that there is produced almost immediately a film or web which is self-supporting.

The regeneration of the cellulose from its xanthate compound proceeds simultaneously with coagulation when the bath contains acid and salt, but at a much lower rate so that the sheet or web has traveled a considerable distance through the bath before regeneration is complete. During this time there is sufficient strength to support the web and prevent rupture thereof.

In the early stages the web has not acquired a high degree of elasticity and is susceptible to plastic distortion. It is in these early stages of great plasticity that the transverse stretching operation of this invention is preferably carried out. For a web traveling 30 to 70 meters per minute it is desirable that it travel approximately 8 to 20 inches through the coagulating and/or regenerating bath before coming in contact with any solid guiding member. During this travel the web acquires sufficient superficial coagulation to give it the necessary support, and sufficient hardness of surface to resist marring when in contact with solid surfaces such as the novel apparatus disclosed herein.

As is well known in the art, the extruded viscose may be first contacted with a coagulating or a coagulating and regenerating (converting) bath. It is customary to follow an initial coagulating bath with a regenerating bath. Baths which produce only a coagulating action are usually merely solutions of a salt such as sodium sulfate. If a combined coagulating and regenerating action is desired, the bath contains, in addition to the salt, an acid such as sulfuric acid. The composition of coagulating and/or regenerating baths is well known in the art, and in the interest of brevity, various compositions are not enumerated here. In U. S. A. Patent No. 2,107,852 (Bolton) a comparatively large list of such baths is disclosed, and reference is made thereto for further information on this point.

The web, after the initial treatments for coagulation and regeneration, passes on to successive treatment vats which complete the regeneration and thereafter desulfur, bleach, wash, impregnate with suitable softeners, and surface size the same. Eventually the film passes to driers which remove the water therefrom. These subsequent steps are well known in the art, and are adequately disclosed in U. S. A. Patent No. 1,548,864 supra.

The curved guide may be of any material which is suitable for installation in the coagulating bath. Among the suitable materials are nickel, stainless steel, glass, and the like. Guides of less resistant materials, with rubber coatings, are also satisfactory.

The curved guide member may be constructed of a rod or tube bent into the desired shape or contour. It may also be suitably fashioned from a slab of material so as to have a rounded edge of the desired curvature or contour. Less desirably, the contour may have relatively sharp edges or contacting edges of an extremely short radius of curvature (with respect to the surface of the film). The curved guide member need not be rigid, but may be constructed of flexible material with suitable arrangements for adjusting and maintaining it in the desired contour or curvature.

The contour may be of constant radius of curvature, or it may be of varying radius of curvature. The constant curvature type may be varied from nearly a straight line to an arc in which the radius of curvature is about 75 inches. The preferred range for the radius of curvature is 100 to 200 inches, preferably 135 inches. As will be clear from the drawings, the ends of the curved guide members may be mounted on bearing surfaces so that the effective curvature with relation to the travel of the web may be varied at will.

Any number of the curved guide members may be used in the coagulating and/or regenerating stage of the process, and their design and arrangement may be adjusted to give any desired effect as the film is operated upon in the novel manner of this invention.

The invention is not limited to the treatment of cellulose web regenerated from viscose, although the results obtained therewith are outstanding. In general any web (sheet, film, foil) recoverable from aqueous solutions (or dispersions), particularly the transparent, non-fibrous, water-sensitive cellulosic webs obtainable by coagulation or precipitation from solution or dispersion in aqueous alkali metal solution, can be advantageously processed in the manner described elsewhere in this application. Examples of such cellulosic materials (other than the viscose type regenerated cellulose) are regenerated cellulose from cuprammonium solutions and lowly etherified cellulose. The webs from aqueous cellulosic solutions of low substituted cellulose ethers of the kind described in U. S. A. Patent No. 2,123,883 (Ellsworth), such as methyl, ethyl and other alkyl celluloses, glycol and other hydroxyalkyl celluloses, and cellulose glycolic acids and other carboxy-akyl celluloses, can be handled in the manner set out above with desirable results. The water soluble, low substituted cellulose esters, such as cellulose (mono) acetate, can be similarly treated.

The invention can also be desirably utilized in connection with the treatment of other web materials having a plastic stage at some point in their production, for example, organic solvent soluble cellulose derivatives, particularly substitution derivatives such as cellulose esters like cellulose acetate and its homologues, and cellulose ethers like ethyl cellulose and its homologues.

The invention is not limited to cellulose, cellulosic materials either aqueous alkali or organic solvent soluble. Such non-cellulosic substances as nylon, polyvinyl acetals (particularly the butyral of the 19% hydroxyl, 80% butyral, 1% acetyl type), phenol-formaldehyde, resin, etc., which can be made plastic by heating, respond satisfactorily to the new process.

It is not necessary to restrict the use of the curved guide members exclusively to the early stages of regenerated cellulose web coagulation and/or regeneration where its plasticity is greatest. In the later stages when the plasticity is reduced it still responds to the transverse stretching of the curved guides.

Webs produced by using the curved guide members described herein, particularly regenerated cellulose webs, are found to be of greatly increased width (and hence of increased area) and of superior physical characteristics, especially that of homogeneity in all directions.

As many apparently widely different embodiments of this invention may be made without departing from the spirit and scope thereof, it is to be understood that this invention is not limited to the specific embodiments thereof, except as defined in the appended claims.

We claim:

1. Film casting apparatus comprising means for extruding a web of cellulosic solution, a coagulating bath through which said web passes during coagulation, a transverse member in said coagulating bath for guiding the extruded cellulosic web therethrough, said member being convex toward the web and pressed thereagainst during the guiding operation, said member being curved to such an extent that it distends the web about 6 inches from the transverse line joining the margins of the web.

2. Film casting apparatus comprising means for extruding a web of cellulosic solution, a coagulating bath through which said web passes during coagulation, a bowed transverse member in said coagulating bath, said member being convex toward the web and pressed thereagainst, and being bowed to such an extent that it distends the center of the web about 6 inches from the transverse line joining the lateral edges of the web where they contact the said member.

3. Film casting apparatus comprising means for extruding a web of cellulosic solution, a coagulating bath through which said web passes during coagulation, an arched transverse member in said coagulating bath, said member being arched on a radius of curvature less than 200 inches but greater than the width of the extruded web and positioned to distend the center of the web at least 4 inches from the line joining the edges of the web where they contact said arched member.

4. Film casting apparatus comprising means for extruding a web of cellulosic solution, a coagulating bath through which said web passes during coagulation, two arched transverse members in said coagulating bath, said members being arched on a radius of curvature less than 200 inches but greater than the width of the extruded web and positioned to distend the center of the web at least 4 inches from the line joining the edges of the web where they contact said arched members.

5. Film casting apparatus comprising means for extruding a web of cellulosic solution, a coagulating bath through which said web passes during coagulation, two arched transverse members in said coagulating bath, said members being arched on a radius of curvature less than 200 inches but greater than the width of the extruded web, one of said members being positioned to distend the center of the web at least 4 inches from the line joining the edges of the web where they contact said arched member.

6. Film casting apparatus comprising means for extruding a web of cellulosic solution, a coagulating bath through which said web passes during coagulation, two arched transverse members in said coagulating bath, said members being arched on a radius of curvature less than 200 inches but greater than the width of the extruded web, one of said members being positioned to distend the center of the web 4 inches from the line joining the edges of the web where they contact said arched member, and the other member being positioned to distend the center of the web 6 inches.

CHARLES L. HUTCHINSON.
GEORGE R. ECKSTEIN.